United States Patent [19]

Sutcliffe et al.

[11] Patent Number: 5,052,529
[45] Date of Patent: Oct. 1, 1991

[54] ACTIVE CONTROL OF VIBRATION

[75] Inventors: Sean G. C. Sutcliffe, London; Graham P. Eatwell, Caldecote; Stephen M. Hutchins, Earith, all of England

[73] Assignee: Topexpress Limited, Cambridge, England

[21] Appl. No.: 493,410

[22] Filed: Mar. 14, 1990

[51] Int. Cl.⁵ .................. F16F 7/10; F16F 15/03
[52] U.S. Cl. ........................... 188/378; 188/380; 248/583; 267/136
[58] Field of Search ............ 188/267, 378, 379, 380; 267/136; 248/550, 583, 603, 618, 620

[56] References Cited

U.S. PATENT DOCUMENTS

| 989,958 | 4/1911 | Frahm | 188/380 |
|---|---|---|---|
| 3,145,012 | 8/1964 | Kfoury | 188/380 X |
| 3,167,294 | 1/1965 | Andrews et al. | 267/136 X |
| 3,703,999 | 11/1972 | Forys et al. | 188/380 X |
| 3,735,952 | 5/1973 | Platus et al. | 267/136 X |
| 4,724,923 | 2/1988 | Waterman | 188/380 X |
| 4,848,525 | 7/1989 | Jacot et al. | 267/136 X |

FOREIGN PATENT DOCUMENTS

| 0283880 | 9/1988 | European Pat. Off. | 267/136 |
|---|---|---|---|
| 1547529 | 10/1968 | France . | |
| 8805506 | 7/1988 | PCT Int'l Appl. . | |

Primary Examiner—Robert J. Oberleitner
Assistant Examiner—Josie A. Ballato
Attorney, Agent, or Firm—Lee, Mann, Smith, McWilliams & Sweeney

[57] ABSTRACT

A vibration mount by which a subject body (10) is mounted on a support (12) by means of an intermediate body (16), and constrictive actuators (22, 24) each of whose dimensions can be changed in a controllable manner by signals supplied from a computer receiving information from sensors on the intermediate body, applies controlled compensating forces to the intermediate body to reduce its vibrations.

11 Claims, 3 Drawing Sheets

ACTIVE CONTROL OF VIBRATION

FIELD OF THE INVENTION

This invention relates to the active control of vibration.

BACKGROUND TO THE INVENTION

When a vibrating body is mounted on a support body, it is often desired to control or minimise the transmission of vibration from the vibrating body to the support body. It is known to reduce the transmission of vibration passively by providing vibration isolators of various forms between the two bodies. It is also known to reduce vibration actively, often in conjunction with the use of passive isolators.

In copending International Patent Application No PCT/GB87/00902, publication no. WO/88/05506 there is described an arrangement for active vibration control in which an intermediate body is mounted between the vibrating body and the support body. The vibration of the intermediate body is sensed and in response thereto controlling forces are applied to the intermediate body by inertial shakers mounted thereon to minimise the vibrations induced by the vibrating body. Whilst such a vibration mount operates satisfactorily, it has been found that for some applications such a mount may be undesirably large and/or heavy.

SUMMARY OF THE INVENTION

According to the present invention there is provided a method of active vibration control in which a subject body, being a vibrating body or a body to be isolated from external vibrations, is mounted on a support by a vibration mount which includes an intermediate body between the subject body and the support, wherein the vibration imparted to the intermediate body is reduced by applying controlled compensating forces to the intermediate body by means of at least two constrictive actuators. These are disposed so that vibrations in at least two of the degrees of freedom of motion of the intermediate body can be reduced. In general, independent control of (N) degrees of freedom will require at least N actuators.

The invention also extends to such a vibration mount by means of which a subject body is mounted on a support and which includes an intermediate body between the subject body and the support, wherein at least one constrictive actuator is provided for applying controlled compensating forces to the intermediate body, so as to reduce vibration of the intermediate body, over at least a part of the frequency range for which control of vibrations is required.

By the term "constrictive actuator" as used herein is meant an acutator whose dimensions can be changed in a controllable way. Examples of constrictive actuators are electrodynamic, piezoelectric, hydraulic and magnetostrictive actuators. In each case the constrictive actuator acts to increase or decrease its dimensions in response to a control signal, which in this case is typically derived from a sensor on the intermediate body.

The intermediate body is preferably a substantially rigid member over the frequency range of vibrations to be controlled.

Where the subject body is a vibrating body to be isolated from the support, each constrictive actuator is mounted between the vibrating body and the intermediate body. Alternatively in the case where, for example, sensitive equipment is to be isolated from a vibrating support, each actuator may be mounted between the intermediate body and the support.

By having each actuator thus mainly supported either by the subject body or the support, so the weight of the intermediate body is kept to a minimum in contrast to that of the inertial shakers disclosed in the above mentioned PCT application.

Typically the actuator is controlled by a computer.

A passive resilient element may be provided between the intermediate body and the subject body where the latter is vibrating, and/or between the intermediate body and the support where the latter is vibrating, so that where the intermediate body is not sufficiently rigid to prevent the passage of high frequency vibrations, or the computer which controls the or each actuator has restricted processing capabilities and cannot respond to these high frequencies, the resilient element is able to absorb such vibrations.

Where the vibrations of the intermediate member occur along six degrees of freedom an appropriate plurality of constrictive actuators are preferably arranged to control the relatively low frequency vibrations over all six degrees of freedom of movement of the intermediate member. Where the vibration of the intermediate member only occurs along three linear orthogonal axes (ie without rotational vibrations) then a correspondingly smaller number of actuators are required.

As each actuator will generally be required to take also the static load of the vibrating body, eg the weight of machinery mounted on the vibration mount, it is preferred for each actuator to be piezoelectric or magnetostrictive, as the design constraints imposed upon such actuators to permit them to support high static loads are less severe than for other actuators.

Alternatively, exceptionally large static loads may be supported on a passive element (eg a compliant or resilient element) in parallel with the actuators. This has the added advantage that the total number and/or size of actuators may be reduced.

The recent development of rare earth alloys (for example the alloy Tb 0.27 Dy 0.73 Fe 1.95) which display large magnetostrictive strain constants, suggests that magnetostrictive actuators are particularly suited where large vibrational displacements must be accommodated.

Magnetostrictive actuators require a bias magnetic field which may be supplied by a permanent magnet or by a direct current in a surrounding coil (or both), while the fluctuating magnetic field required may be supplied by an alternating current in a coil which, if a coil is employed to produce the bias field, may be the same coil. Where the actuators have to be prestressed this may be achieved by prestressing bolts, having due regard to the static load to be supported.

Where the subject body is to be free to vibrate, the intermediate body conveniently may be surrounded by a generally cup shaped member and be connected thereto by a plurality of constrictive actuators. Where the cup shaped member is prestressed by bolts extending therethrough and through the intermediate body, clearance holes may be provided in the intermediate body to avoid direct contact between it and the bolts.

The intermediate body may be substantially flat and rectangular in shape, and a pair of actuators may then be disposed at each side, and two pairs of actuators may be provided respectively above and below.

Alternatively, instead of having the actuators thus arranged in opposed pairs, one of each such actuators in an opposed pair may be replaced by a passive element, thus halving the number of actuators required. Preferably such passive elements are arranged at the upper or static load bearing side of the intermediate body, thereby reducing the size of the opposite actuator.

Alternatively, a simpler form may be adopted if constrictive actuators capable of deforming in shear in response to a control signal are used. For example, the piezoelectric material lead zirconate titanate, also known as PZT, is capable of this. In this case, a minimum of three compound actuators may be provided above the intermediate body. Each compound actuator is to comprise a stack of three constrictive actuators. Two of these are to be capable of deforming in shear in directions normal to the axis of the stack, these directions also being normal to each other, in response to control signals; another is to be capable of deforming in extension or compression parallel to the axis of the stack. Thus the top of each stack may be caused to move in any direction relative to the intermediate body to which it is fixed at its base. The subject body may then be supported on the tops of the three or more compound actuators; this may conveniently be done via a cap plate resting on the compound actuators but not fixed rigidly to them.

Where the subject body comprises, for example, one or more machines mounted on a rectangular raft or table, a mount constructed in accordance with the invention may be provided at each corner thereof.

A vibration mount in accordance with the invention operates to keep the intermediate body substantially stationary, or to allow very limited (eg very low frequency) displacement to occur. The control for the mount may be broadband or periodic, and will require at least two channels, using a number of sensors to determine the drives to the actuators. The sensors may be accelerometers, for example, which may be mounted on the appropriate part or parts of the mount.

Although prior published literature describes constrictive actuators employed for vibration control, such actuators have not been utilised, for simultaneous control of several degrees of freedom, in combination with an intermediate body. For example an electrostrictive actuator system is known from French Patent Specification No 1547529, in which a rigid table containing sensitive equipment is isolated from a support by a plurality of single degree of freedom actuators to prevent vibrations from the support from reaching the table. Up to six degrees of freedom of the table are covered. However, any lack of rigidity in the table in such a system, allows vibrations to be imparted to the sensitive equipment, which is avoided by the present invention.

BRIEF DESCRIPTION OF THE DRAWINGS

The invention will now be described, by way of example only, with reference to the accompanying drawings in which.

DETAILED DESCRIPTION OF THE DRAWINGS

Figure 1:
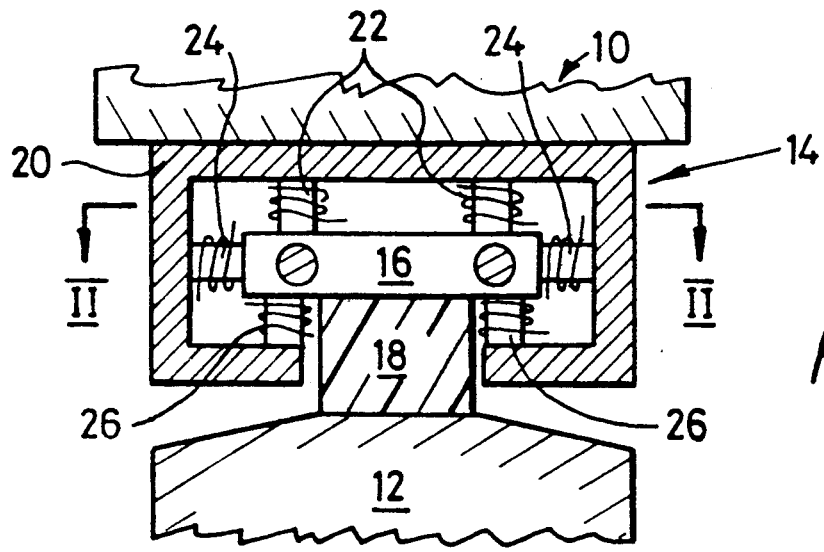
FIG. 1 is a side view, partly in section, of a vibration mount in accordance with the invention.
Figure 2:
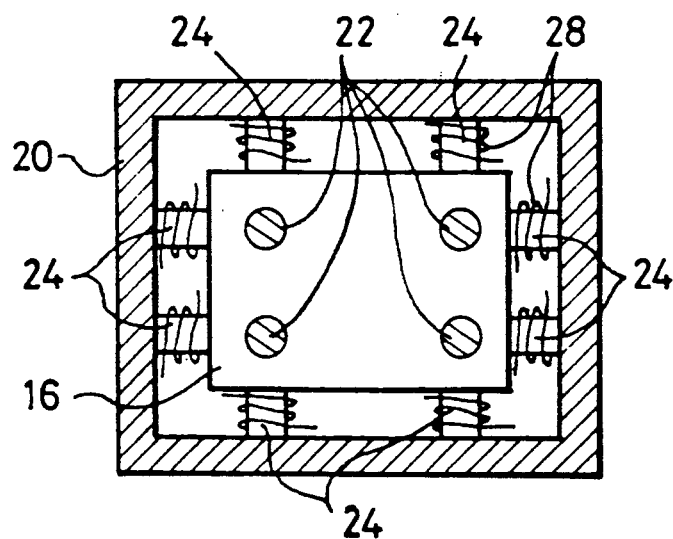
FIG. 2 is a sectional plan view of the mount taken on the line II—II in FIG. 1.

Referring first to FIGS. 1 and 2 there is shown generally at 10 (FIG. 1) a vibrating body supported by a support 12, with an active vibration mount 14 disposed therebetween.

The mount 14 comprises an intermediate body 16 of generally rectangular shape supported from the support 12 by a resilient element 18 of elastomeric material. The body 16 is generally surrounded by a cup shaped structure 20 secured to the vibrating body 10.

Disposed between the upper surface of the intermediate body 16 and the inside horizontal surface of the structure 20 are arranged two pairs of constrictive actuators 22.

Similarly disposed between each of the four edges of the intermediate body 16 and the corresponding surfaces of the structure 20 are four pairs of actuators 24. Between the lower surface of the intermediate body and the corresponding lower parts of the structure 20 are arranged two further pairs of constrictive actuators 26. These latter actuators 26 are shown displaced from the upper actuators 22, although they may instead be arranged to be aligned therewith.

Each of the actuators making up the pairs of actuators 22, 24, 26 is a magnetostrictive actuator, for example one made of the rare earth alloy Tb 0.27 Dy 0.73 Fe 1.95. Each actuator is cylindrical in shape and is surrounded by a coil 28.

A steady magnetic bias field is provided either by a direct current flowing in the coil 28 and/or by means of a permanent magnet (not shown). Expansion and contraction of the actuator length is achieved by varying the current flowing in the coil and "vibration" of the actuator is achieved using an alternating current of appropriate frequency.

Figure 3:
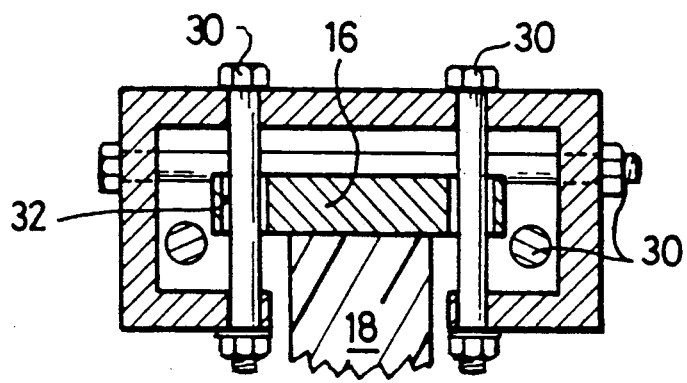
FIG. 3 is a view similar to FIG. 1 but showing prestressing bolts in the mounts.

Referring now to FIG. 3, there are shown a number of prestressing bolts 30 fitted to the structure 20 in order to prestress the respective actuators. Where a bolt passes through a hole in the intermediate body 16, such as hole 32, the hole is made oversize to provide clearance and thereby avoid direct contact between the structure 20 and the intermediate body 16.

In use sensors (not shown), such as accelerometers, are fitted to the intermediate body 16, and signals from these are fed to a control system which includes a microprocessor 34 to produce a correction signal corresponding to the corrective action required to counteract the vibration sensed. Typically this correction signal comprises an alternating current of appropriate amplitude and frequency which flows in the coils associated with the respective actuator(s) which are thus caused to cyclically change in length to neutralize any vibration of the intermediate body.

By providing these pairs of constrictive actuators, as illustrated, it is possible to control vibration in all six degrees of freedom of motion.

Figure 4:
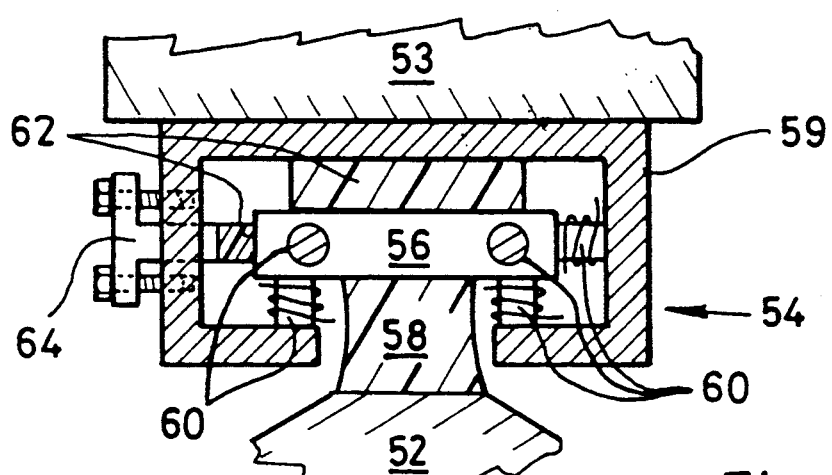
FIG. 4 is a side view similar to FIG. 1 showing a modified vibration mount.

Refering next to FIG. 4, there is shown a modified vibration mount 54 in which the number of actuators is half that for the first embodiment of FIGS. 1 and 2.

As with the first embodiment, the mount 54 is disposed between an upper vibrating body 53 and a support 52. The mount 54 again comprises a rectangular intermediate body 56 carried by the support 52 through a resilient passive element 58.

Surrounding the body 56 is a generally cup-shaped structure 59, secured to the vibrating body 53. A compliant passive element 62 supports the structure 59 from the upper surface of the body 56. Between the left-hand edge of the body 56 and the corresponding inside surface of the structure 59 is disposed a smaller passive element 62; a passive element (not shown) is also disposed between the rear edge of the body 56 (as viewed in FIG. 4) and the corresponding inside surface of the structure 59. As with the mount 14 of FIGS. 1 and 2, a pair of constrictive actuators 60 is arranged at each side between the lower surface of the body 56 and the corresponding parts of the structure 59. A pair of actuators 60 are also disposed between the right-hand edge of the body 56 and the corresponding inside surface of the structure 59, with a similar pair 60 being disposed between the front edge of body 56 (as viewed in FIG. 4) and the corresponding inside surface of the structure 59. Thus there are four pairs of actuators 60 in the present mount 54, instead of eight pairs as in the previously described mount 14, since one actuator of each of the opposing pairs of FIGS. 1 and 2 is replaced by a compliant passive element. The stiffness of these passive elements is calculated with due regard to the stiffness of the actuators and the size of the displacements to be controlled.

An added feature of this arrangement is that the static load of the upper vibrating body can be supported on a passive element which may reduce the size of constrictive actuators required, especially where extremely large static loads are present.

In the arrangements of FIGS. 1, 2 and 4, a shear isolation may additionally be provided between two or more orthogonally mounted actuators by inserting a passive compliance element (not shown) at both ends of each actuator to allow lateral and rocking movements at both ends thereof.

Figure 5:
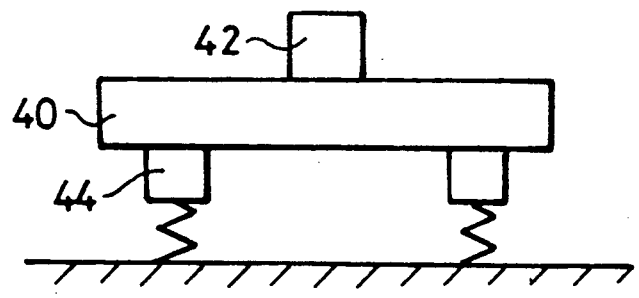
FIG. 5 is a side view of a raft or table which is mounted on a plurality of vibration mounts.

Referring now to FIG. 5 there is shown a rectangular raft or table 40 on which is mounted a vibrating machine 42. Four vibration mounts 44, each similar to the vibration mount 14 described above, are situated one at each corner of the raft. This isolates vibrations of the machine 42 from the support, typically the ground, even when the raft is not itself completely rigid.

An arrangement similar to FIG. 5 may also be utilised where sensitive equipment is to be isolated from a support (which may be the ground) and which itself may be subject to vibration. However in this case each vibration mount 44 has its cup shaped structure 20 inverted and secured to the support or the ground, so that vibrations between the support or ground and the intermediate bodies 16 of the mounts 44 are counteracted by the constrictive actuators. A resilient element, such as element 18, is disposed between the raft and each intermediate body (not shown) in each mount to absorb high frequency vibrations. This arrangement again reduces the transfer of vibrations from the support or the ground to the sensitive equipment even where the raft is not a rigid member.

Figure 6:
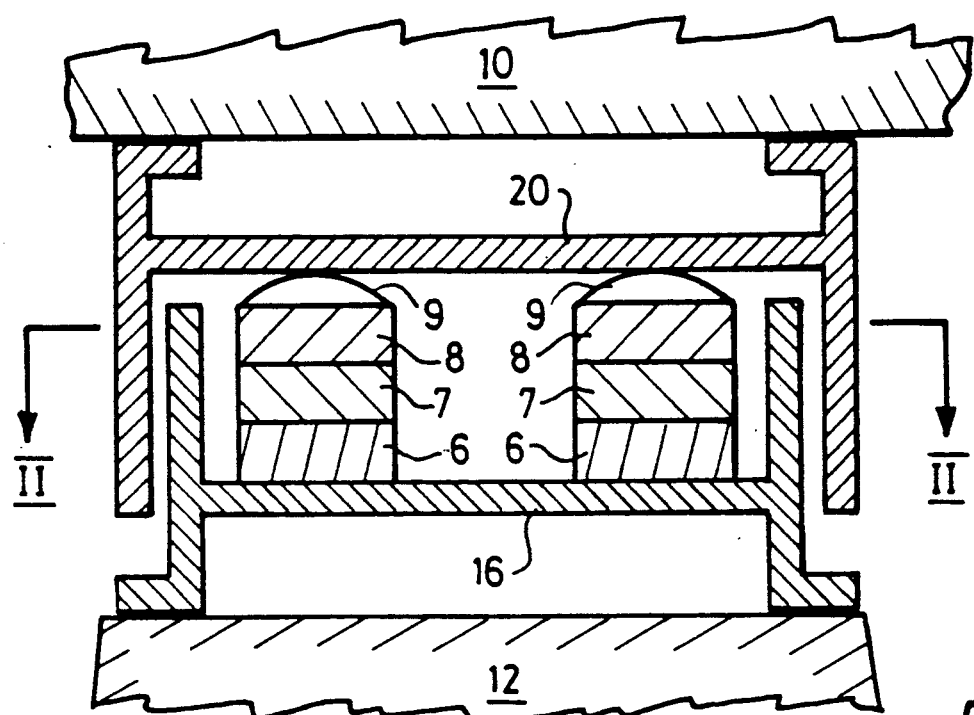
FIG. 6 is a side view, partly in section, of a vibration mount in accordance with the invention, which utilises compound stacks of constrictive actuators capable of deforming in shear and extension.
Figure 7:
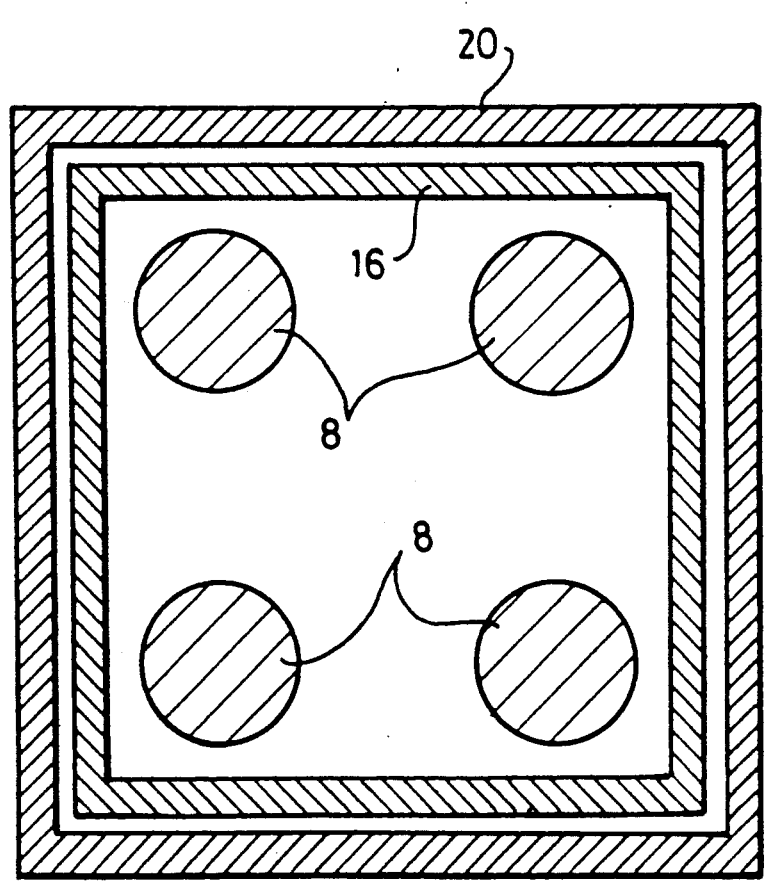
FIG. 7 is a sectional view of the mount of FIG. 6 taken on the line II—II.

Referring to FIGS. 6 and 7, these show an active vibration mount employing compound stacks of shear and extension actuators. A vibrating body 10 is supported on the upper plate 20 of the active vibration mount. This in turn is supported on the tops of the actuator stacks, which may be surmounted by hemispherical hard caps 9. These caps are intended to produce point contacts with the upper plate 20 and thus to prevent the upper plate from exerting torques on the actuator stacks. Each stack includes an actuator 8 to produce vertical displacements of the cap, and two mutually orthogonal horizontal directions. The bases of the stacks are supported by the intermediate body 16, which in turn may be supported on a resilient element 18.

We claim:

1. A vibration mount by means of which a subject body is mounted on a support and which includes an intermediate body between the subject body and the support, wherein at least two dimension-changing constrictive actuators are provided for applying controlled compensating forces to the intermediate body so as the reduce vibration of the intermediate body in at least two of its degrees of freedom of motion and over at least a part of the frequency range for which control of vibrations is required, wherein said intermediate body is substantially flat and rectangular in shape, and wherein a pair of said actuators are disposed at each side of said intermediate body, and opposed pairs of actuators are disposed respectively above and below said intermediate body.

2. A vibration mount according to claim 1, wherein the intermediate body is a substantially rigid member over the frequency range of vibrations to be controlled.

3. A vibration mount according to claim 1, wherein the actuators are controlled by a computer.

4. A vibration mount according to claim 1, wherein a passive resilient element is provided between the intermediate body and at least one of the subject body and the support, whichever is vibrating.

5. A vibration mount according to claim 1, wherein the intermediate member has up to six degrees of freedom, and said constrictive actuators are arranged to control the relatively low frequency vibrations over all six degrees of freedom of movement of the intermediate member.

6. A vibration mount according to claim 1, wherein static loads are supported on a passive element in parallel with the actuators.

7. A vibration mount according to claim 1, wherein said actuators are magnetostrictive actuators whose fluctuating magnetic field is supplied by an alternating current in a coil.

8. A vibration mount according to claim 1, wherein at least one of said actuators is prestressed by prestressing bolts.

9. A vibration mount according to claim 1, wherein said subject body is free to vibrate, and said intermediate body is surrounded by a generally cup shaped member connected thereto by said constrictive actuators, said cup shaped member being prestressed by bolts extending therethrough and through the intermediate body, clearance holes being provided in the intermediate body to avoid direct contact between it and the bolts.

10. A vibration mount according to claim 1, wherein one of each of said opposed pairs of actuators is a passive element, such passive elements being arranged at the load bearing side of the intermediate body.

11. A vibration mount according to claim 1, having at least three actuators provided above said intermediate body, each actuator being a compound actuator comprising a stack of three constrictive actuators, two capable of deforming in shear in mutually orthogonal directions normal to the axis of the stack in response to a control signal, and another capable of deforming parallel to the axis of the stack.

* * * * *